(12) United States Patent
Haverkos

(10) Patent No.: US 7,627,670 B2
(45) Date of Patent: Dec. 1, 2009

(54) METHOD AND APPARATUS FOR SCORING UNSOLICITED E-MAIL

(75) Inventor: Todd David Haverkos, Palatine, IL (US)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 10/835,500

(22) Filed: Apr. 29, 2004

(65) Prior Publication Data
US 2006/0031306 A1 Feb. 9, 2006

(51) Int. Cl.
G06F 15/173 (2006.01)
G06F 15/16 (2006.01)

(52) U.S. Cl. .................. 709/224; 709/206; 709/207; 709/223

(58) Field of Classification Search .......... 709/204, 709/206, 207, 223–225
See application file for complete search history.

(56) References Cited

U.S. PATENT DOCUMENTS

| | | | |
|---|---|---|---|
| 5,826,022 A | 10/1998 | Neilsen | 395/200.36 |
| 5,999,932 A * | 12/1999 | Paul | 707/10 |
| 6,052,709 A | 4/2000 | Paul | 709/202 |
| 6,249,805 B1 | 6/2001 | Fleming, III | 709/206 |
| 6,266,692 B1 | 7/2001 | Greenstein | 709/206 |
| 6,321,267 B1 | 11/2001 | Donaldson | 709/229 |
| 6,493,007 B1 | 12/2002 | Pang | 345/835 |
| 6,574,627 B1 | 6/2003 | Bergadano et al. | 707/9 |
| 6,578,025 B1 | 6/2003 | Pollack et al. | 707/2 |
| 6,615,242 B1 | 9/2003 | Riemers | 709/206 |
| 6,779,021 B1 * | 8/2004 | Bates et al. | 709/206 |
| 6,898,715 B1 * | 5/2005 | Smithson et al. | 726/24 |
| 6,915,334 B1 * | 7/2005 | Hall | 709/207 |
| 7,072,942 B1 * | 7/2006 | Maller | 709/206 |
| 7,089,241 B1 * | 8/2006 | Alspector et al. | 707/7 |
| 7,136,920 B2 * | 11/2006 | Castell et al. | 709/224 |

* cited by examiner

Primary Examiner—Ario Etienne
Assistant Examiner—Hussein A El Chanti
(74) Attorney, Agent, or Firm—Yee & Associates, P.C.; David A. Mims, Jr.; Rudolf O. Siegesmund

(57) ABSTRACT

A method for filtering spam is disclosed comprising the steps of: assigning weights to a plurality of recipient e-mail addresses; determining a set of similar e-mails from a plurality of e-mails sent to the recipient addresses; calculating a score based for each set of similar e-mails; placing the score in the header of the e-mail; determining whether the score exceeds a threshold; and responsive to determining that the score exceeds the threshold, tagging and/or filtering the e-mail.

1 Claim, 3 Drawing Sheets

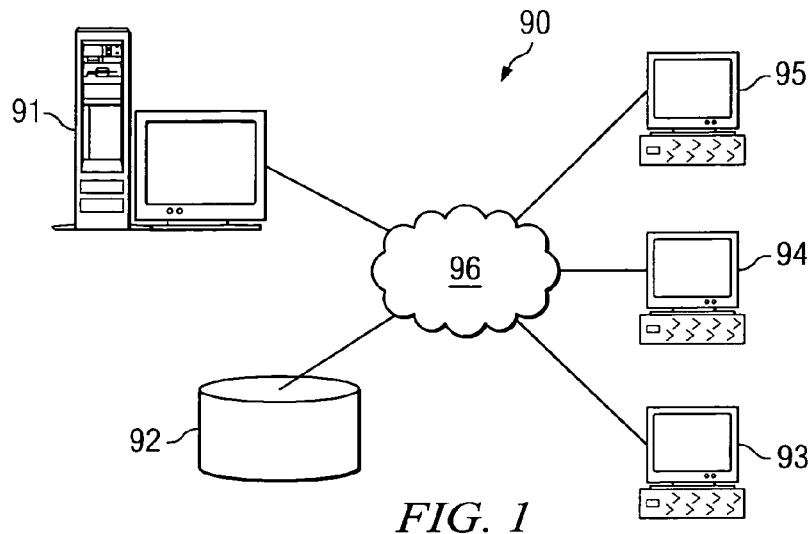
FIG. 1
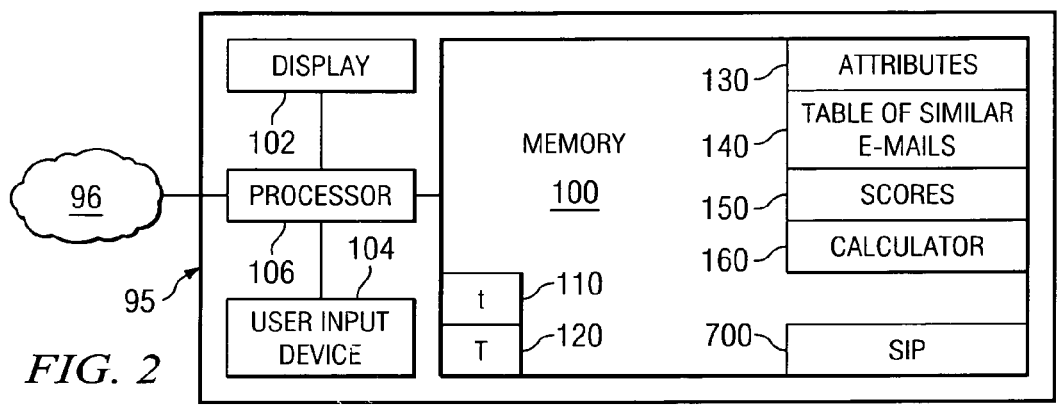
FIG. 2
| MAIL | TYPE | WEIGHT |
|------|------|--------|
| 1 | AA | -20 |
| 6 | CC | 100 |
| 12 | FF | 45 |
| TOTAL | | 125 |
FIG. 5
| MAIL | TYPE | WEIGHT |
|------|------|--------|
| 4 | BB | 20 |
| 11 | DD | 90 |
| TOTAL | | 110 |
FIG. 6

FIG. 3A (300)

| | |
|---|---|
| AA | -20 |
| BB | 20 |
| CC | 100 |
| DD | 90 |
| EE | 60 |
| FF | 45 |

FIG. 3B (350)

| | |
|---|---|
| AT1 | MESSAGE LENGTH |
| AT2 | SENDER |
| AT3 | SMTP GATEWAYS |
| AT4 | RECEIVED HEADERS |
| AT5 | SUBJECT LINES |
| AT6 | NUMBER OF RECIPIENTS |
| AT7 | ATTACHMENT FILENAMES |
| AT8 | EMAIL ADDRESSES OF RECIPIENTS |
| AT9 | FILE SIZE OF ATTACHMENTS |
| AT10 | URLs REFERENCED IN THE MAIN BODY |

FIG. 4 (400)

| MAIL | AT1 | AT2 | AT3 | AT4 | AT5 | AT6 | AT7 | AT8 | AT9 | AT10 |
|---|---|---|---|---|---|---|---|---|---|---|
| 1 | C | | D | | | A | | | | L |
| 2 | K | | D | | | | | | | |
| 3 | | B | | | | A | N | | | |
| 4 | | B | | F | E | | | | O | |
| 5 | | | D | | | | | | | |
| 6 | C | | D | | | A | | | | L |
| 7 | C | | | | | | | | | |
| 8 | | G | | | | I | | P | | |
| 9 | J | | H | | | | R | | | |
| 10 | | | D | | | | | | Q | |
| 11 | | B | | F | E | | | | O | |
| 12 | C | | D | | | A | | | | L |

METHOD AND APPARATUS FOR SCORING UNSOLICITED E-MAIL

FIELD OF THE INVENTION

The present invention is directed generally to a method for identifying unwanted electronic mail and specifically, to a method for identifying unwanted electronic mail by scoring based upon attributes and recipient e-mail addresses.

BACKGROUND OF THE INVENTION

Electronic mail, commonly known as e-mail, is a service for the transmission of messages over a communications network offered by online services and Internet Service Providers (ISPs). The messages, entered from an input device connected to a computer, can be text, electronic files, or a combination of both text and files. E-mail is received in an electronic mailbox from which it can be read, stored in a text file, forwarded to another address, or deleted. E-mails may be sent to a mailing list so that the message is automatically sent to all of the e-mail addresses on the list.

In addition to e-mail which is an SMTP protocol, messages can be posted to an on-line discussion group via the NNTP protocol. For example, USENET provides a bulletin board that can be accessed worldwide through the Internet via the NNTP protocol. USENET employs e-mail addresses to sign messages so that the e-mail address is exposed to the Internet in postings.

A problem arises in that much e-mail is not solicited and is not wanted. Nevertheless, it must be processed at the mailbox. The large amount of unwanted e-mail is due to three factors: e-mail is extremely easy to send, it is extremely inexpensive in relation to the number of messages that can be delivered, and addresses are easy to obtain. E-mail addresses are easy to obtain because programs can be written to automatically acquire addresses from mailing lists or on line discussion group message boards. In addition, programs can generate addresses from simple alpha numeric generation, some of which will coincide with actual addresses.

Unwanted e-mail is often referred to as "spam." As used herein, the term "spam" shall mean any unwanted e-mail sent to a person with a mailbox for receiving e-mails. Many methods for unsolicited e-mail are known. AMERICA ON LINE and PRODIGY use a filter that excludes e-mail addresses that are identified with unsolicited mail. Since the law does not allow ISPs to automatically block e-mail addresses, such filters are only available upon user request. Additionally, such an approach will always lag behind rapid changes in the source of unsolicited e-mail. Other methods are based upon inclusion lists. Inclusion lists require continual manual updating. Therefore, applications for dealing with spam can be analyzed in terms of those that are based on exclusion and those that are based on inclusion.

A number of United States patents have been granted in the area of spam exclusion. In general, exclusion methods seek to identify the source or content of the unwanted e-mail and to identify it for deletion or exclusion from the mailbox. U.S. Pat. No. 6,578,025 to Pollack (the '025 patent) discloses a method for providing information based on the relevancy of the information to the users to whom the information is provided. The method of the '025 patent includes receiving an incoming message and generating similarity scores indicating similarities between the incoming message and features of a plurality of messages. The similarity score may be based upon a message feature database. The similarity score is used to develop a relevancy score based on a user profile. U.S. Pat. No. 5,826,022 discloses a mechanism for ignoring a particular on-going e-mail discussion using an ignored discussion database configured to store information relating to a recipient selected discussion.

U.S. Pat. No. 6,249,805 to Fleming discloses a filtering system that uses a list to identify authorized senders. U.S. Pat. No. 6,321,267 (the '267 patent) to Donaldson discloses a proxy that actively probes remote hosts in order to identify dial up PC's, open relays, and forged e-mail. In the '267 patent, a sender's message must pass through all layers of protection. If the sender's message does not pass through all layers, it is rejected and logged. Subsequent mail from the same host is blocked. U.S. Pat. No. 6,615,242 (the '242 patent) to Riemers discloses a system to identify spam by identifying a Uniform Resource Locator (URL) in a message and fetching information from the URL. The information is analyzed to determine whether the message that includes the URL is spam. If a determination is made that the message is spam, action is taken, such as deleting the message, displaying the message with a flag, and/or sending the message to a third party. U.S. Pat. No. 6,052,709 to Paul (the '709 patent) discloses a method for controlling delivery of unsolicited e-mail. In the '709 patent, one or more spam probe e-mail addresses are created and "planted at various sites on the communication network in order to insure their inclusion on spam mailing lists. The mailbox corresponding to the spam probe is monitored and incoming mail is analyzed to identify the source of the message. An alert signal is generated containing the spam source data. The alert signal is broadcast to all network servers for action by the filtering system.

A number of United States patents have been granted based upon user inclusion. U.S. Pat. No. 5,999,932 to Paul (the '932 patent) discloses a system for eliminating unsolicited electronic mail. In the '932 patent, if data from one or more fields of an incoming mail message matches identification data in a user inclusion list, the message is marked "OK." If no match is made, at least one heuristic process is used to determine whether the mail may be of interest to the user. If the message satisfies one or more criteria from the process, it is marked "NEW." If the message does not satisfy any criteria of the process, the message is marked "JUNK." U.S. Pat. No. 6,266,692 to Greenstein (the '692 patent) discloses a method for blocking and/or filtering unwanted e-mail by providing selected senders with a passcode. In the '592 patent, when an e-mail is received at a mail server node, a field in the header of the message is checked. If the passcode is correct, the message is sent. If the passcode is incorrect, the message is deleted. If there is no passcode, the message is held until the receiver approves.

All methods, whether based upon exclusion or inclusion, rely on filters. Currently known techniques for filtering include Bayesian filtering, subject filtering, sender filtering, or heuristic filtering that examine individual messages or groups of messages sent to a single e-mail address. Such filtering methods may look at the sender address to either determine exclusion or inclusion. However, many spam messages come from random e-mail addresses that vary on a per-recipient basis in order to defeat "blacklisting" of certain sender e-mails. Therefore, other elements of the message must be considered. For example, Bayesian filtering relies heavily on keyword frequency.

Many email recipients have more than one address and receive e-mail at multiple addresses. It is quite common for individuals to have multiple email addresses that forward to a common location/server or "canonical email address" where they read their mail. As discussed above, current anti-spam technologies evaluate e-mail messages on attributes of the sender. In other words, the "From:" information is scrutinized for the sender's address, the SMTP relays, crosses, subject, line count, attachments, or other headers. However, no method or application is known that examines the email address by which the message arrives in the mailbox. In other words, the above described solutions do not look at the "To:" section of the e-mail, the address to which the e-mail was sent. In addition there are no known methods that analyze the "Received" header, which is necessary in order to determine the true recipient address. Analysis of the "Received" header is necessary because spam senders routinely ignore the "To:" headers and blind copy the spam targets. There are no known spam filtering methods that are based upon examination of e-mail from the perspective of multiple recipient e-mail addresses for a single user.

What is needed is a method of identifying spam that looks at patterns in e-mails sent to multiple recipient addresses received by a single e-mail server. What is further needed is a method to identify spam based on the recipient address at which an e-mail was received, so that a suspiciously similar e-mail sent to different address can be identified and analyzed. In addition, a need arises for a process that can "learn" so that as additional e-mail is received, the process can go back and tag an email after it has been processed (for example, when a 6th message is received that is found to be similar and the score for that e-mail is added to the previous five similar e-mails). In this way an e-mail that may not immediately be identified as "spam" can be tagged as such after sufficient additional e-mails are received to make a more positive identification.

SUMMARY OF THE INVENTION

The present invention, which meets the needs identified above, is a method for filtering spam comprising the steps of: assigning weights to a plurality of recipient e-mail addresses; determining a set of similar e-mails from a plurality of e-mails sent to the recipient addresses; calculating a score based for each set of similar e-mails; placing the score in the header of the e-mail; determining whether the score exceeds a threshold; and responsive to determining that the score exceeds the threshold, tagging and/or filtering the e-mail.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an illustration of a computer network used to implement the present invention;

FIG. 2 is an illustration of a computer, including a memory and a processor, associated with the present invention;

FIG. 3A is a table showing weights assigned by type of e-mail addresses;

FIG. 3B is a table showing various types of attributes;

FIG. 4 is a table showing values for attributes in a group of tracked e-mails;

FIG. 5 is a table showing a score calculation for a first set of e-mails with different address and matching attributes;

FIG. 6 is a table showing a score calculation for a second set of e-mails with different addresses and matching attributes.

DETAILED DESCRIPTION OF THE PREFERRED EMBODIMENT

Figure 7:
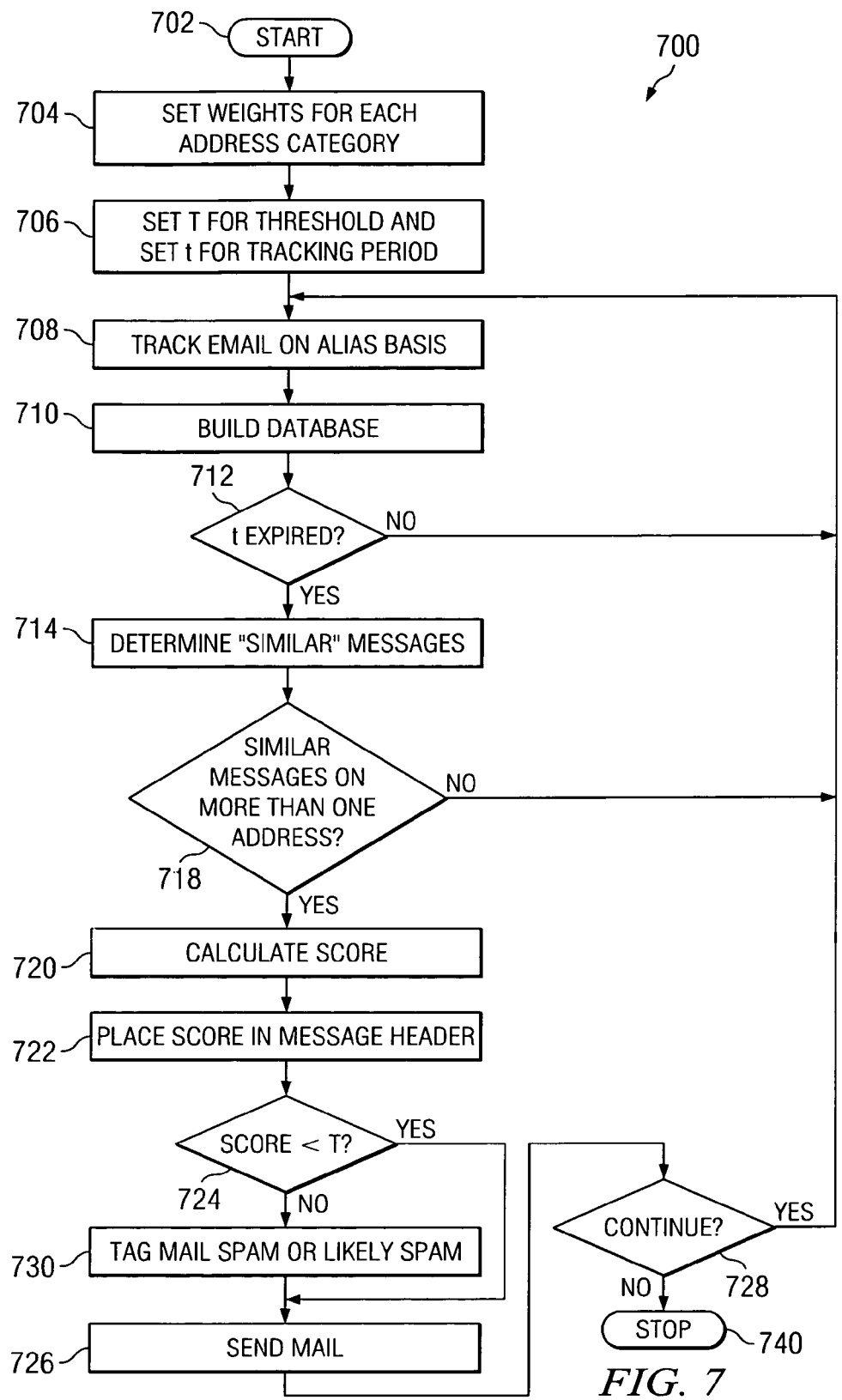
FIG. 7 is a flow chart of the spam identification process.

As used herein, the term "attribute" means a segment of an e-mail used for comparison with corresponding segments on other e-mails.

As used herein, the term "canonical address" means a standard e-mail address used in business.

As used herein, the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "filter" means to direct e-mail based upon a score placed in the header of the e-mail and includes without limitation deleting the e-mail, identifying the e-mail as spam, or identifying the e-mail as likely spam.

As used herein, the term "sender address" means the e-mail address of the originator or forwarder of an e-mail.

As used herein, the term "recipient address" means the e-mail address to which an e-mail is sent, forwarded and/or by which the e-mail is received.

As used herein, the term "spam" means unwanted e-mail.

FIG. 1 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network containing the present invention and is not meant as an architectural limitation.

The internal configuration of a computer, including connection and orientation of the processor, memory, and input/output devices, is well known in the art. The present invention is a methodology that can be embodied in a computer program. Referring to FIG. 2, the methodology of the present invention is implemented on local computer 95. Local computer 95 has display 102, user input device 104, and memory 100 connected to processor 106. Processor 106 is connected to the network 96. Memory 100 has attributes file 130, table of similar e-mails 140, scores file 150, calculator program 160, time interval "t" file 110 and threshold "T" file 120. Calculator program 160 uses attributes file 130, table of similar e-mails 140, scores file, time interval "t" file 110 and threshold "T" file 120 in order to attach an X header to processed e-mails designating them as "Spam" or "likely Spam." Additional designations are possible. For example, additional and/or alternate designations such as "possible spam" and "legitimate" may be incorporated. Span Identification Program (SIP) 700 is shown in memory 100 (see FIG. 7). The process of SIP 700 is based upon answering the question "what is the probability an e-mail identified as "similar" and received on a number of different recipient email addresses within a specified time period is not spam." For example, six e-mail messages may be received on four different recipient e-mail address within one hour and the six e-mail messages have been identified as being similar. In order to identify similar recipient e-mail addresses, attributes of the messages are tabulated for comparison. In addition, the recipient e-mail addresses are assigned weights based upon the probability that they have or have not been captured by a spam sender or spam address catching program. For example, an e-mail address that is only to a specific company or website, and which receives e-mail from ("From:") that company or web site would be weighted to score as "non-spam," but an e-mail received from other senders on that e-mail address would be weighted to score as "spam." An e-mail address deliberately released on the Internet as a spam identifier, or "honeypot" would have the highest weight for scoring as spam. Because a variety of addresses are taken into consideration, the process has the ability to "learn," and an e-mail address may over time have its identification changed, either to "spam" or to "not spam" based upon the accumulation of data.

FIG. 3A depicts table 300 showing weights to be applied to six different categories of e-mail address. Row 310 shows category AA, designated "whitelist" with a weight of −20. Category AA is an e-mail address that is only given out to those to whom the user wants to receive e-mail and contains e-mail addresses that have not been subject to capture by spam programmers. Category AA email addresses are from domains and senders from which legitimate mail is expected. These addresses are placed on a whitelist. Moreover, as mail is received and qualified, addresses can be added to the whitelist.

Row 312 shows category BB, designated "canonical address" showing a weight of 20. Category BB includes business card email address and addresses given out to friends, family and relatives. It is not possible to accurately assign a percentage weight to Category BB since it is not possible to know whether an address has become compromised and picked up by a spam programmer. Examples of category BB addresses are todd@mydomain.com, mom@mydomain.com, brother@mydomain.com, and so on. In the general case, Category BB email addresses will receive the most unpredictable mix of spam and legitimate mail. Therefore, an algorithm to develop a score for Category BB should use all possible information in the correlation process.

Row 314 shows category CC, designated "Spam Trap" showing a weight of 100. Category CC is a deliberately circulated e-mail address designed to capture spam. The "Spam Trap" is sometimes referred to as a "honeypot." Mail sent to this address is automatically suspicious and has a probability close to 100% of being spam. In other words, a Spam Trap is an address released onto the Internet or Usenet in a way that the person releasing the Spam Trap would never expect a legitimate e-mail. Normally, the user would throw away everything received at this address. However, the value of the Spam Trap address is that the user learns from the mail received on this address. If on a canonical address, the user gets a message that is found to be similar to a message received at the Spam Trap, the message will be correlated and given a higher "spam like" score than another such a message would receive otherwise.

Row 316 shows category DD, "Company" showing a weight of 90. Category DD includes company e-mail addresses with whom a user may do business and from whom the user would expect only infrequent business communications. For example, if a user signs up for an account with Yahoo, he will use yahoo@mydomain.com or yahoo.com. The user does not expect anything legitimate on this address from anything but a @yahoo.com address (for example, for a password reset, or info. on the yahoo service). Row 318 shows category EE, designated "Webpage" showing a weight of 60. Category EE includes webcontact@mydomain.com. Any WEBPAGE address will be subject to capture by spam programmers. Therefore a high percentage of spam is expected on this address. Row 320 shows category FF, designated "Usenet" showing a weight of 45. Category FF includes usenet1@mydomain.com, any joe@hobbynewsgroup.com, and jim@hobbynewsgroup.com. USENET should be treated with a high degree of suspicion. This is an address the user posts to newsgroups—where email addresses are routinely harvested for spam software (sometimes referred to as "spambots"). Occasionally, a known person from a USENET newsgroup might send a legitimate mail from that address, but the user is willing to do very aggressive spam filtering on this address, because by definition, such correspondence isn't that important. The user can expect a lot of unsolicited mail on this address.

FIG. 3B depicts attribute table 350. Column 352 lists the attributes and column 354 lists the description. Row 360 shows AT1 described as "message length." Row 362 shows AT2 described as "sender." Row 364 shows AT3 described as "smtp gateways." Row 366 shows AT4 described as "received headers." Row 368 shows AT5 described as "subject lines." Row 370 shows AT6 described as "number of recipients." Row 372 shows AT7 as "attachment file names." Row 374 shows AT8 with "email addresses of recipients." By "e-mail addresses of recipients" is meant an analysis of aggregated addresses to determine if there are multiple addresses for the same user. For example, spam senders will often aggregate their "To:" list so that an e-mail address may appear as "To: blah@mydomain.com, foo@mydomain.com, anotheraddress@mydomain.com." If two or more of the email addresses belong to the same person, then this is an indicator that the message is spam. Row 376 shows AT9 with "file size of attachments." The file size of the attachments is useful because the filename is often randomized by spam senders. Row 378 shows AT10 with "URL's referenced in the main body." Examples of other attributes that could be listed in an attribute table such as attribute table 350 are: keywords, subject, text, sender, random tracking numbers, and URLs listed in the message.

FIG. 4 depicts correlation table 400. Correlation table 400 has mail column 402 which lists 12 received e-mails. AT 1 Column 404 shows values for AT1 for e-mails that possessed this attribute. The values of AT1 are represented by the letters as shown. In like manner, AT 2 column 406, AT3 column 408, AT4 column 410, AT5 column 412, AT6 column 414, AT8 column 418, AT9 column 420, and AT10 column 412, each contain values for the designated attribute in the row corresponding to the numbered e-mail in mail column 402. The purpose of correlation table 400 is to determine which e-mails have similar attributes. Correlation table 400 may also be used to determine which e-mails have sufficiently similar attributes where an exact match is not necessary. Comparing the rows of correlation table 400, e-mails 1, 6, and 12 can be seen to each have AT1 with a value of C, AT3 with a value of D, AT6 with a value of A, and AT10 with a value of L. In addition, e-mails 4, and 11 each have AT2 with a value of B, AT4 with a value of F, AT 5 with a value of E, and AT9 with a value of O. Therefore, these two sets of e-mails can be said to be "similar" in that they share the same attributes with the same values.

FIG. 5 depicts first calculation table 500 showing the category for each e-mail for the first set of similar e-mails determined from correlation table 400. E-mail 1 is category AA and, referring to table 3A, is accorded a weight of −20. E-mail 6 is category CC and, referring to table 3A is accorded weight 100. E-mail 12 is category FF and, referring to table 3A, is accorded weight 45. Total weight 510 is calculated to be 125 by summing the weights for e-mail 1, e-mail 6, and e-mail 12.

FIG. 6 depicts a second calculation table 600 showing the category of each e-mail for the second set of similar e-mails determined from correlation table 400. E-mail 4 is category BB and, referring to table 3A, is accorded a weight of 20. E-mail 11 is category DD and, referring to table 3, is accorded a weight of 90. Total weight 610 is calculated to be 110 by summing the weights for e-mail 4 and e-mail 11.

FIG. 7 depicts a flow chart for Spam Identification Program (SIP) 700. SIP 700 starts (702) and weights are set for each address category (704). A variable "t" is set to a value for the time interval of the tracking period for emails (706). SIP 700 then tracks e-mails on an alias basis (708). Attributes are determined for each e-mail tracked and these attributes are placed in a database (710). A determination is made as to whether "t" has expired (712). If not, SIP 700 continues to track e-mails. If so, SIP 700 finds similar messages in the database (714). Persons skilled in the art are aware that programs can be written to include "sufficiently similar" matches as well as exact matches. Next, a determination is made as to whether any of the similar messages are on more than one e-mail address. If not, SIP 700 goes to step 708 and continues to track e-mails. If so, SIP 700 calculates a score for each set of similar messages on more than one e-mail address. The score is placed in the message header of each e-mail (722). A determination is made as to whether the score is less than the threshold value T. If not, the e-mail is tagged depending on the score (730), and the mail is sent (726). Persons skilled in the art are aware that multiple levels may be established for threshold value T such as T1, T2, T3 and so forth. For example, scores below T1 could be tagged "legitimate," scores between T1 and T2 could be tagged "possible spam," scores between T2 and T3 could be tagged "likely spam," and scores of T3 or above would be tagged "spam." In addition to being tagged, the e-mail can be filtered based upon the tag depending on the user's preferences. If so, the mail is sent (726). A determination is made whether SIP 700 should continue (728). If so, SIP 700 goes to step 708. If not, SIP 700 stops (740).

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method for identifying and marking each email in one or more sets of similar emails from a plurality of emails, received on a number of different recipient email addresses within a specified period of time at a single server, as spam comprising:

establishing a first plurality of e-mail address categories for a single email server;

assigning a weight to each of the first plurality of email address categories;

creating a table containing the plurality of e-mail address categories and a second plurality of weights, each weight corresponding to a single email category;

establishing a third plurality of email attributes;

establishing a threshold;

tracking a fourth plurality of emails on an alias basis for the single email server;

building a database for the single email server showing a fifth plurality of values for each email corresponding to the third plurality of email attributes;

using the database, determining one or more sets of similar emails by identifying those emails in the database having the same attributes and the same values for each of the same attributes;

using the table, determining a weight for each email address in the one or more sets of similar email addresses;

calculating a score for each set of similar emails by adding together each weight for each email address in each set;

placing the score in the header of each email in the set;

determining if the score exceeds the threshold;

when the score exceeds the threshold, tagging each email with the score in the header as spam;

wherein each email in the one or more sets of similar emails from the plurality of emails, received on the number of different recipient email addresses within the specified period of time, is marked as spam.

* * * * *

UNITED STATES PATENT AND TRADEMARK OFFICE
CERTIFICATE OF CORRECTION

| | |
|---|---|
| PATENT NO. | : 7,627,670 B2 |
| APPLICATION NO. | : 10/835500 |
| DATED | : December 1, 2009 |
| INVENTOR(S) | : Todd David Haverkos |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1230 days.

Signed and Sealed this

Second Day of November, 2010

David J. Kappos
*Director of the United States Patent and Trademark Office*